（12） United States Patent
Sharma et al.

(10) Patent No.: US 10,845,606 B1
(45) Date of Patent: *Nov. 24, 2020

(54) EYE TRACKING FOR A HEAD MOUNTED DISPLAY INCLUDING A PANCAKE LENS BLOCK

(71) Applicant: Facebook Technologies, LLC, Menlo Park, CA (US)

(72) Inventors: Robin Sharma, Redmond, WA (US); Ying Geng, Bellevue, WA (US); Brian Wheelwright, Sammamish, WA (US); Jacques Gollier, Sammamish, WA (US); Yusufu Njoni Bamaxam Sulai, Snohomish, WA (US); Andrew John Ouderkirk, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/546,165

(22) Filed: Aug. 20, 2019

Related U.S. Application Data

(63) Continuation of application No. 15/874,554, filed on Jan. 18, 2018, now Pat. No. 10,429,656.

(51) Int. Cl.
| | |
|---|---|
| *G02B 27/01* | (2006.01) |
| *G02B 27/14* | (2006.01) |
| *G02B 27/28* | (2006.01) |
| *G06F 3/13* | (2006.01) |
| *G06T 7/00* | (2017.01) |
| *G06F 3/01* | (2006.01) |

(52) U.S. Cl.
CPC ..... *G02B 27/0179* (2013.01); *G02B 27/0172* (2013.01); *G02B 27/141* (2013.01); *G02B 27/286* (2013.01); *G06F 3/013* (2013.01); *G06T 7/0012* (2013.01); *G02B 2027/014* (2013.01); *G02B 2027/0138* (2013.01); *G02B 2027/0187* (2013.01); *G06T 2207/10048* (2013.01); *G06T 2207/30041* (2013.01)

(58) Field of Classification Search
CPC ............ G02B 27/0179; G02B 27/0172; G02B 27/141; G02B 27/286; G06F 3/013; G06T 7/0012
USPC .......................................................... 348/78
See application file for complete search history.

(56) References Cited

U.S. PATENT DOCUMENTS

| | | |
|---|---|---|
| 5,801,885 A | 9/1998 | Togino |
| 2016/0180591 A1 | 6/2016 | Shiu et al. |
| 2016/0195723 A1 | 7/2016 | Murray et al. |
| 2017/0154464 A1 | 6/2017 | Lanier et al. |
| 2017/0161951 A1 | 6/2017 | Fix |

*Primary Examiner* — Patricia I Young
(74) *Attorney, Agent, or Firm* — Fenwick & West LLP (57) ABSTRACT

A head-mounted display (HMD) includes a pancake lens block, an eye tracking system, and an electronic display. The electronic display is coated with a dichroic film that transmits visible light and reflects infrared light (IR). An IR emitter illuminates an eye of the user, and infrared light is reflected from an eye through the pancake lens block and is incident on the dichroic film. The reflected light is captured by an image capturing element of the eye tracking system that is positioned at a periphery of HMD located off-axis relative to an optical axis of the pancake lens block.

20 Claims, 9 Drawing Sheets

EYE TRACKING FOR A HEAD MOUNTED DISPLAY INCLUDING A PANCAKE LENS BLOCK

CROSS REFERENCE TO RELATED APPLICATIONS

This application is a continuation of co-pending U.S. application Ser. No. 15/874,554, filed Jan. 18, 2018, which is incorporated by reference in its entirety.

BACKGROUND

The present disclosure generally relates to eye tracking in head mounted display, and specifically to eye tracking solutions utilizing an off-axis camera in a head mounted display with a pancake lens assembly.

A virtual reality head mounted display (HMD) can be used to simulate virtual environments. For example, stereoscopic images can be displayed on an electronic display inside the HMD to simulate the illusion of depth and head tracking sensors can be used to estimate what portion of the virtual environment is being viewed by the user. Some HMDs utilize a pancake lens assembly to direct light of a virtual scene from the electronic display to an exit pupil of the HMD and eventually to the eye of a user. A pancake lens assembly or pancake lens block for a HMD, in one embodiment, includes a back curved optical element and a front smaller curved optical element in optical series. The back optical element includes a surface that is partially reflective to allow a portion of light from the display screen to travel through the back optical element, while another portion of light is reflected. The front optical element includes a polarized reflector that reflects light waves with electric fields oriented perpendicular to a polarization direction of the polarized reflector and allows light waves with electric fields parallel to the polarization direction to travel through. The pancake lens block additionally includes one or more waveplates or other optical elements with the back curved optical element and the front curved optical element that alter the polarization state of light waves travelling through the waveplates. Unlike the optics blocks of other HMDs that do not make use of a pancake lens block, the back focal plane distance of the back curved optical element is relatively small (e.g., ~5-6 mm). This limits the placement of an eye tracking assembly that have conventionally used a "hot mirror" (or dichroic) between the lens and the electronic display.

SUMMARY

Embodiments relate to a head mounted display (HMD) that includes at least one processor, an electronic display screen to display a virtual scene to a user wearing the HMD, a pancake lens block, and an eye tracking system. The pancake lens block includes a back optical element and a front optical element. The back optical element transmits a portion of light from the electronic display screen. The front optical element is in optical series with the back optical element and reflects the portion of light from the electronic display screen back to the back optical element. The back optical element then reflects a second portion of light from the front optical element back to the front optical element for transmission to an exit pupil of the VR headset.

The pancake lens block, in one embodiment, is quasi-concentric concave-convex lens, with the concave side of the block closer to the eye and the convex side towards the display. The concave side is laminated with a reflective polarizer and a quarter wave-plate, while the convex side includes a 50/50 beam-splitter coating. The coatings and polarizers are designed to work over the visible spectrum: 400-700 nm. Light emitted by the display is in the visible spectrum.

The eye tracking system includes a reflective optical element, at least one image capturing element, and a controller in communication with the eye tracking system. Eye-tracking is carried out at some wavelength in the near infrared (e.g., 830-870 nm). The reflective optical element is between the back optical element and the electronic display and transmits light from the electronic display and reflects near-infrared spectrum light from and eye of a user. The at least one image capturing element receives the near-infrared spectrum light from the eye of the user that has been reflected off the first optical element between the back optical element and the electronic display screen. The eye tracking system then analyzes one or more images captured by the at least one image capturing element to identify one or more glints corresponding to the eye of the user, and determines a gaze direction of the eye of the user based on the identified glints from the one or more images.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Overview

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

In particular, a head-mounted display (HMD) that includes a pancake lens block, an eye tracking system, and an electronic display. The HMD includes a dichroic optical element or hot mirror (i.e., a dichroic layer, film, free standing optical element, etc.) that transmits visible light and reflects infrared light (IR). An IR emitter illuminates an eye of the user, and the IR light is reflected from an eye through the pancake lens block and eventually incident on the dichroic element. The dichroic element then reflects the IR light to image capturing element (e.g., a camera) of the eye tracking system that is positioned at a periphery of (i.e., off-axis relative to) the pancake lens block. In order to be received by the image capturing element located at the periphery, therefore, the IR light undergoes one or more reflections, depending on the embodiment, between the dichroic element and a reflective optical element, such as a reflective polarizer, a beam splitter (e.g., a 50/50 reflective coating), and so forth, before being imaged by the image capturing element.

A Pancake Lens

Figure 1:
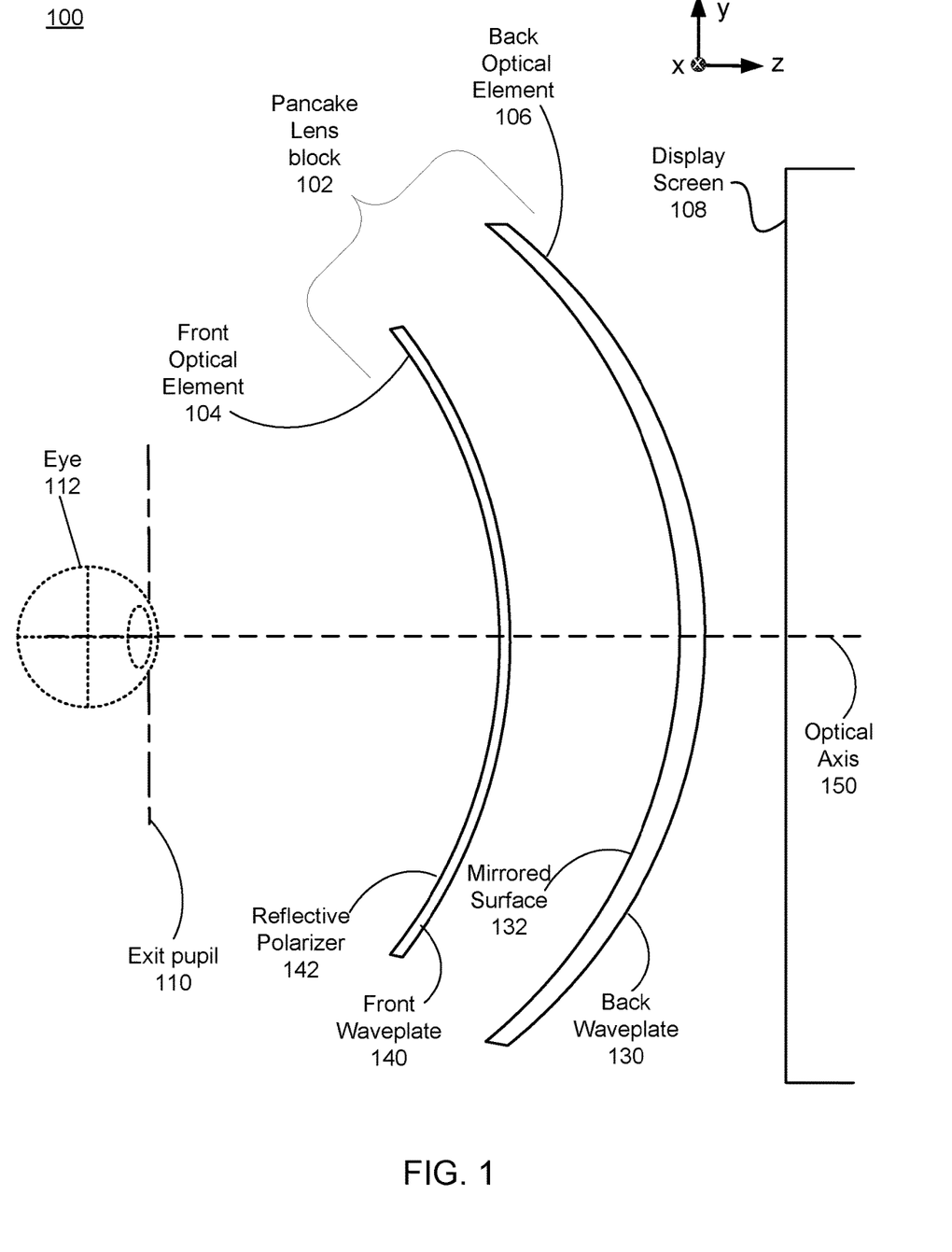
FIG. 1 is an example pancake lens block, in accordance with one embodiment.
Figure 2:
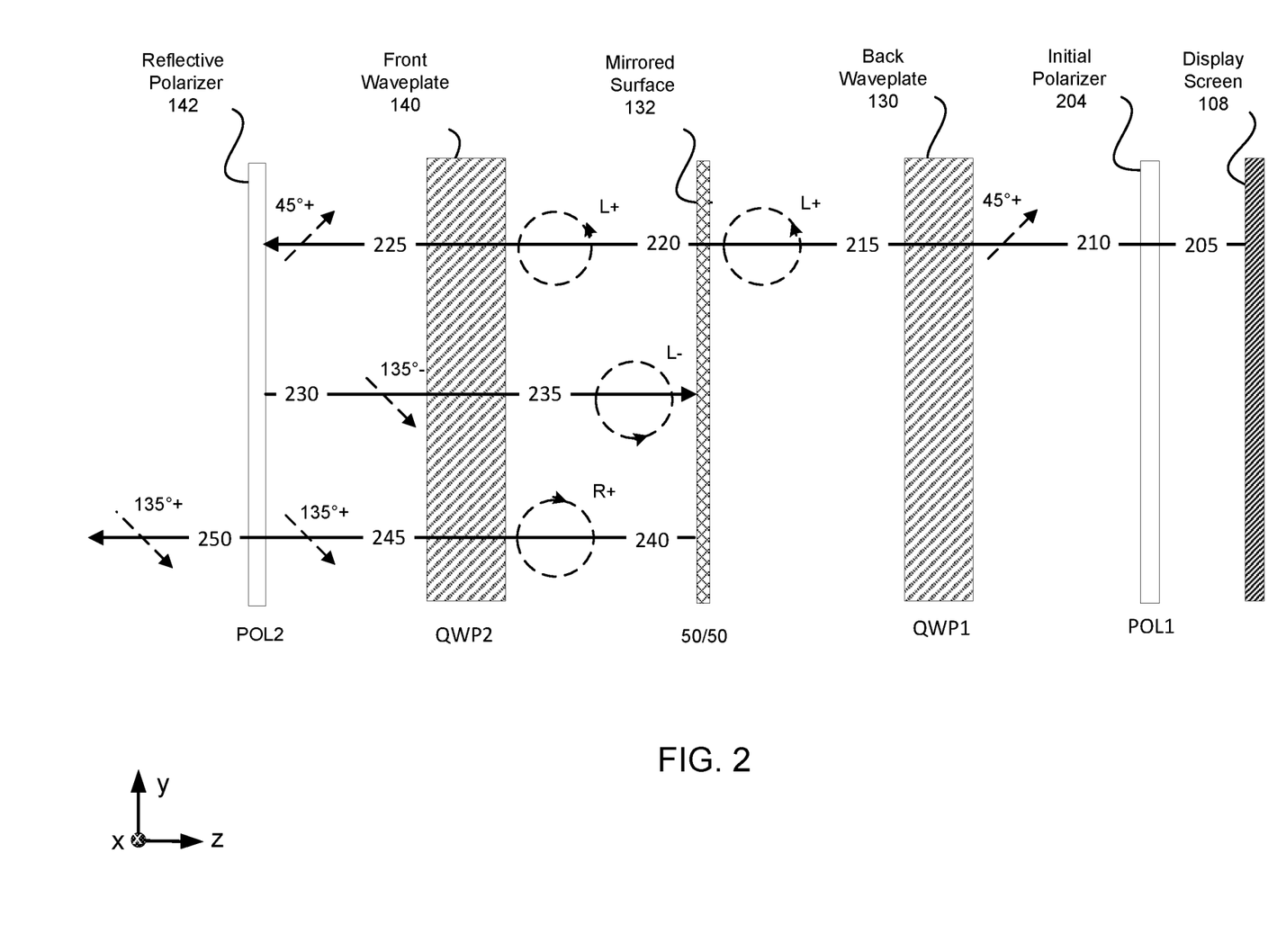
FIG. 2 shows a folded optical path with example polarization states of pancake lens block, in accordance with one embodiment.

FIG. 1 is a cross section 100 of an embodiment of pancake lens block 102 (PLB 102), in accordance with an embodiment. PLB 102 produces a folded optical path by utilizing polarizing optical components and provides sufficient optical power in a compact system. PLB 102, in some embodiments, is part of a head mounted display (HMD) and includes front optical element 104 and back optical element 106 that focuses light from electronic display screen 108 to exit pupil 110 where eye 112 of a user is positioned when viewing content on electronic display screen 108. For purposes of illustration, FIG. 1 shows a cross section 100 of PLB 102 associated with a single eye 112, but another pancake lens assembly, separate from PLB 102 shown in FIG. 1, can provide altered image light to another eye of the user. Some embodiments of the pancake lens have different components than those described here. Similarly, in some cases, functions can be distributed among the components in a different manner than is described here.

Light emitted from electronic display 108 is linearly polarized. In some embodiments, electronic display 108 includes one or more linear polarizers (POL1) that linearly polarized light emitted from electronic display 108. Alternatively, light emitted from light emitting components (e.g., LEDs) is emitted as linearly polarized light.

PLB 102 includes front optical element 104 and back optical element 106. One or more surfaces of front optical element 104 and back optical element 106 are shaped to correct for field curvature. One or more surfaces of front optical element 104 may be shaped to be spherically concave (e.g., a portion of a sphere), spherically convex, plane, a rotationally symmetric asphere, a freeform shape, or some other shape that mitigates field curvature. In some embodiments, the shape of one or more surfaces of front optical element 104 and back optical element 106 are designed to additionally correct for other forms of optical aberration. In some embodiments, one or more of the optical elements within PLB 102 may have one or more coatings, such as anti-reflective coatings, to reduce ghost images and enhance contrast.

Back optical element 106 includes back waveplate 130 and mirrored surface 132. In this example, back waveplate 130 is a quarter-waveplate that shifts polarization of received light. A quarter-waveplate has a polarization axis oriented at 45 degrees relative to incident linearly polarized light such that back waveplate 130 converts linearly polarized light into circularly polarized light. Likewise, a quarter-waveplate converts circularly polarized light to linearly polarized light. Quarter-waveplates are usually made of birefringent materials such as quartz, organic material sheets, or liquid crystal. In one embodiment, the quarter-waveplates are designed to be optimized such that the dependence of the retardance induced by the plate remains close to a quarter of a wave independently of the wavelength and the angle of incidence. Mirrored surface 132 is partially reflective to reflect a portion of the received light. In some embodiments, mirrored surface 132 is configured to transmit 50% of incident light and reflect 50% of incident light.

Front optical element 104 includes front waveplate 140 and reflective polarizer 142. Front waveplate 140 is also a quarter-waveplate and reflective polarizer 142 is a polarization sensitive partially reflective mirror configured to reflect received light of a first linear polarization and transmit received light of a second linear polarization. For example, reflective polarizer 142 may be a wire grid polarizer configured to reflect linearly polarized light with a polarization direction in the x-direction, and pass light that is linearly polarized in the y-direction.

Although shown as surfaces of front optical element 104 and back optical element 106 respectively, back waveplate 130 and front waveplate 140 can be separate from optical element 104 and back optical element 106 in some embodiments. For example, back waveplate 130 can be located between mirrored surface 132 and electronic display 108 (e.g., as a freestanding element in air, laminated on the surface of electronic display 108, etc.) and front waveplate 140 also be similarly located anywhere between mirrored surface 132 and reflective polarizer 142. Further, although shown as curved, the individual optical elements that together compose front optical element 104 and back optical element 106 in FIG. 1 can be flat or be a mix of flat and curved elements when separately provided. For example, as separate elements, back waveplate 130 and front waveplate 140 could be provided flat while mirrored surface 132 and reflective polarizer 142 are curved, among other variations. In one embodiment, back waveplate 130 and front waveplate 140 can be of a cylindrical shape.

PLB 102 mitigates field curvature and accordingly acts to reduce pupil swim. Field curvature is an optical aberration that causes a flat object to appear sharp only in a certain part(s) of the frame, instead of being uniformly sharp across the frame. More generally, field curvature is a result of a focal distance of an optics system not perfectly aligning with all the points on a focal plane. Pupil swim is the effect caused by changes in the location of a user's eye within an eyebox results in distortions in the content being presented to the user. Correcting for field curvature mitigates pupil swim. The pancake lens mitigates field curvature in an image that is output to a user's eyes to reduce pupil swim. Additionally, PLB 102 has a small form factor, is relatively low weight compared to other optical systems designed to remove field curvature and is configured to have a wide field of view. The operation of PLB 102 is discussed below with respect to FIG. 2.

Folded Optical Path of a Pancake Lens

FIG. 2 shows a folded optical path of PLB 102, in accordance with one embodiment. Light 205 from electronic display screen 108 is initially polarized via initial polarizer 204 (POL1) to linearly polarized light 210. Note that, in some embodiments, the light emitted by the display is already linearly polarized, in which case POL1 is not needed. Back waveplate 130 (QWP1) is a quarter-waveplate with an axis 45 degrees relative to the direction of polarization of light 210. The orientation of the waveplate axis relative to the incident linearly polarized light controls the handedness and polarization ellipticity of the emitted circularly polarized light. QWP1 changes the polarization of light 210 from linear polarization to circular polarization for the designed wavelength at the designed angle—shown as light 215. The polarization of light 215 may be clockwise or anti-clockwise based on the orientation of the axis of QWP1 relative to incident linearly polarized light.

A first portion of light 215 is reflected by mirrored surface 132, and a second portion of light 220 is transmitted by mirrored surface 132 towards front waveplate 140 (QWP2). In some embodiments, mirrored surface 132 is configured to reflect 50% of incident light (e.g., the light 215). Similarly, QWP2 is a quarter-waveplate and changes the polarization of light 220 from circular to linear (referred to as light 225). Light 225 is incident on reflective polarizer 142 (POL2), which reflects light that is polarized in a blocking direction (e.g., x direction) and transmits light that is polarized in a perpendicular direction (e.g., y-direction). At this point, light 225 is linearly polarized in the blocking direction. Thus, POL2 reflects light 225 and the reflected light is referred to as light 230. Accordingly, light 230 is again incident on QWP2 which changes the linear polarized light 230 to circularly polarized light 235 and mirrored surface 132 reflects a portion of the polarized light 235, as described above. The reflected portion of light 235 is referred to as light 240.

Light 240 is also circularly polarized; however, its handedness is opposite that of light 235 and 220 due to the reflection from mirrored surface 132. Thus, QWP2 changes the polarization of circularly polarized light 240 to linearly polarized light 245. However, as the handedness of the light 240 is opposite to that of light 220, the polarization of light 245 is perpendicular to that of light 225. Accordingly, light 245 is linearly polarized in a direction (e.g., y) perpendicular to the blocking direction (e.g., x) and is therefore transmitted by QWP2 as light 250.

Example Eye Tracking System

Unlike the optics blocks of other HMDs that do not make use of a pancake lens block, the back focal plane distance of the back curved optical element is relatively small (e.g., ~5-6 mm) and this limits the possible locations of the image capturing element and other components of the eye tracking system. In order to solve this problem and adequately be able to image the eye of a user for eye tracking, a "hot mirror" (or dichroic optical element) between the pancake lens block and the electronic display is employed to reflect light to the image capturing element that is located off-axis relative to the pancake lens block and electronic display.

Figure 3:
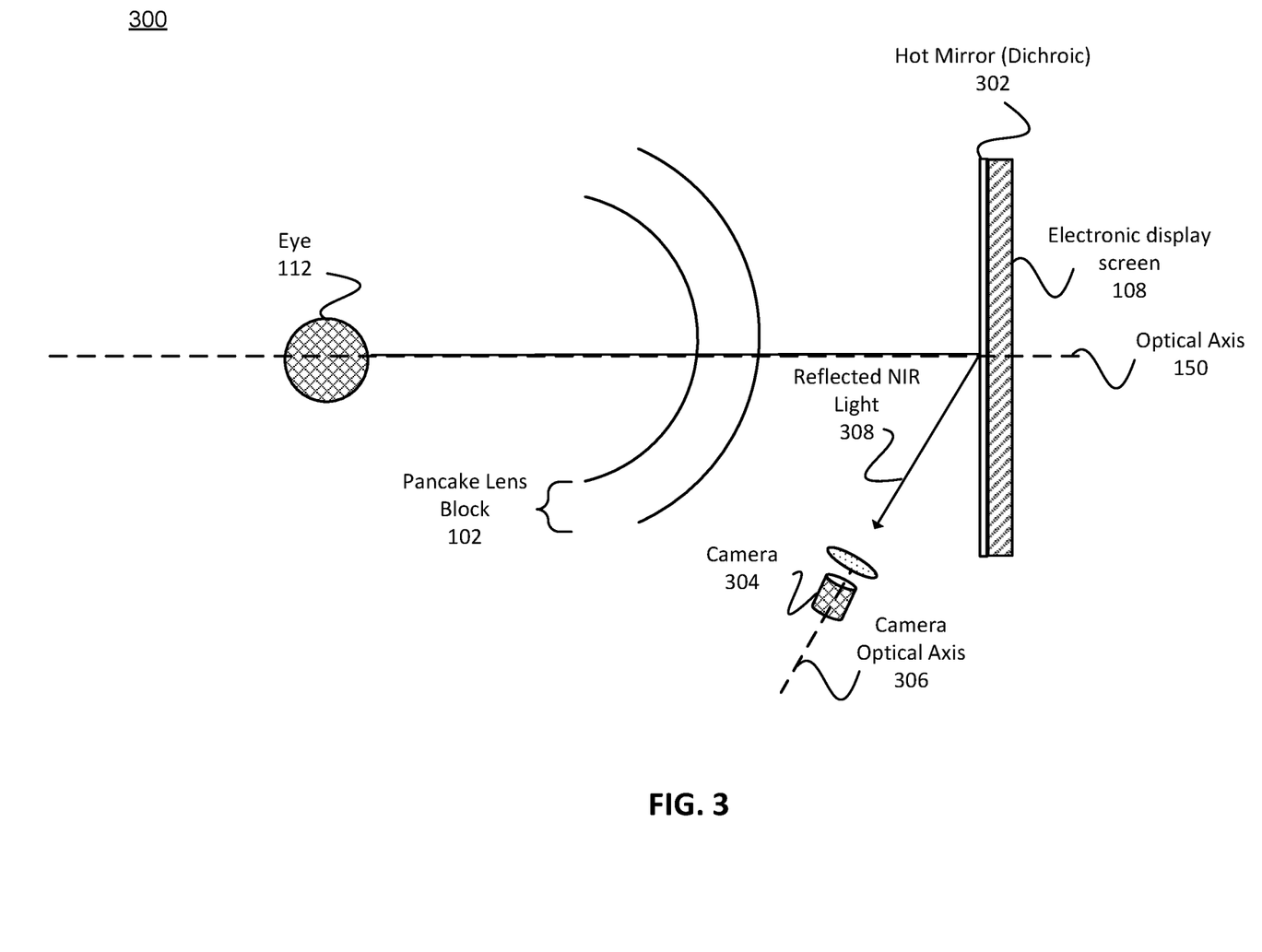
FIG. 3 shows an example head-mounted display that includes a pancake lens block with a dichroic element on a transmission surface of an electronic display screen configured to cause infrared light reflected from an eye of a user to undergo a single reflection off the dichroic element to an image capturing element, in accordance with one embodiment.

FIG. 3 shows an example HMD 300 that includes PLB 102, electronic display 108, dichroic element or hot mirror 302 on a transmission surface of electronic display screen 108. The hot mirror 302, in one embodiment, is a film on electronic display 108 configured to transmit light in the visible spectrum, reflect light in the near-infrared (NIR), and, in this particular embodiment, cause NIR light reflected from an eye 112 of a user to undergo a single reflection off hot mirror 302 to an image capturing element 304 located off-axis relative to an optical axis 150 of PLB 102 (i.e., camera optical axis 306 is positioned at an angle relative to optical axis 150 of PLB 102). This allows the camera 304 to be located adjacent (e.g., to the side, in a periphery, etc. relative to) optical axis 150 while still allowing a reflection of the eye 112 to be viewable to the eye tracking system, as shown in FIG. 3.

In this example, near-infrared spectrum (NIR) light 308 reflected or scattered off the front surface of the eye 112 is transmitted through PLB 102 (i.e., the concave surface of the front optical element 104 and through mirrored surface 132 of the convex surface of the back optical element 106) and incident on hot mirror 302. Accordingly, PLB 102 and hot mirror 302 are configured such that the rays of the NIR light 308 deviate far enough away from PLB 102 to be imaged by camera 304 located off to the side or underneath PLB 102. The eye tracking system then analyzes the images captured by the camera 304 to identify one or more glints corresponding to the location of the eye 112 of the user and determines a gaze direction of the eye 112 based on the location of the glints.

The eye tracking system, in one embodiment, includes an infrared (IR) emitter that emits the NIR light 308. The IR emitter can be located adjacent or integrated with the camera 304 (or located elsewhere). Thus, in one embodiment, the IR emitter emits the NIR light 308 toward the hot mirror 302 that causes the NIR light 308 to be reflected off the electronic display screen 108 and eventually to the eye 112 of the user to illuminate the eye 112 for imaging by the camera 304. Thus, FIG. 3 shows an embodiment of an eye tracking configuration for a pancake lens block in a head mounted display that utilizes a hot mirror or dichroic film or coating on the electronic display that causes NIR light rays to undergo a single reflection before being received by a camera located at an angle or off to the side of the optical axis of the pancake lens block.

Figure 4:
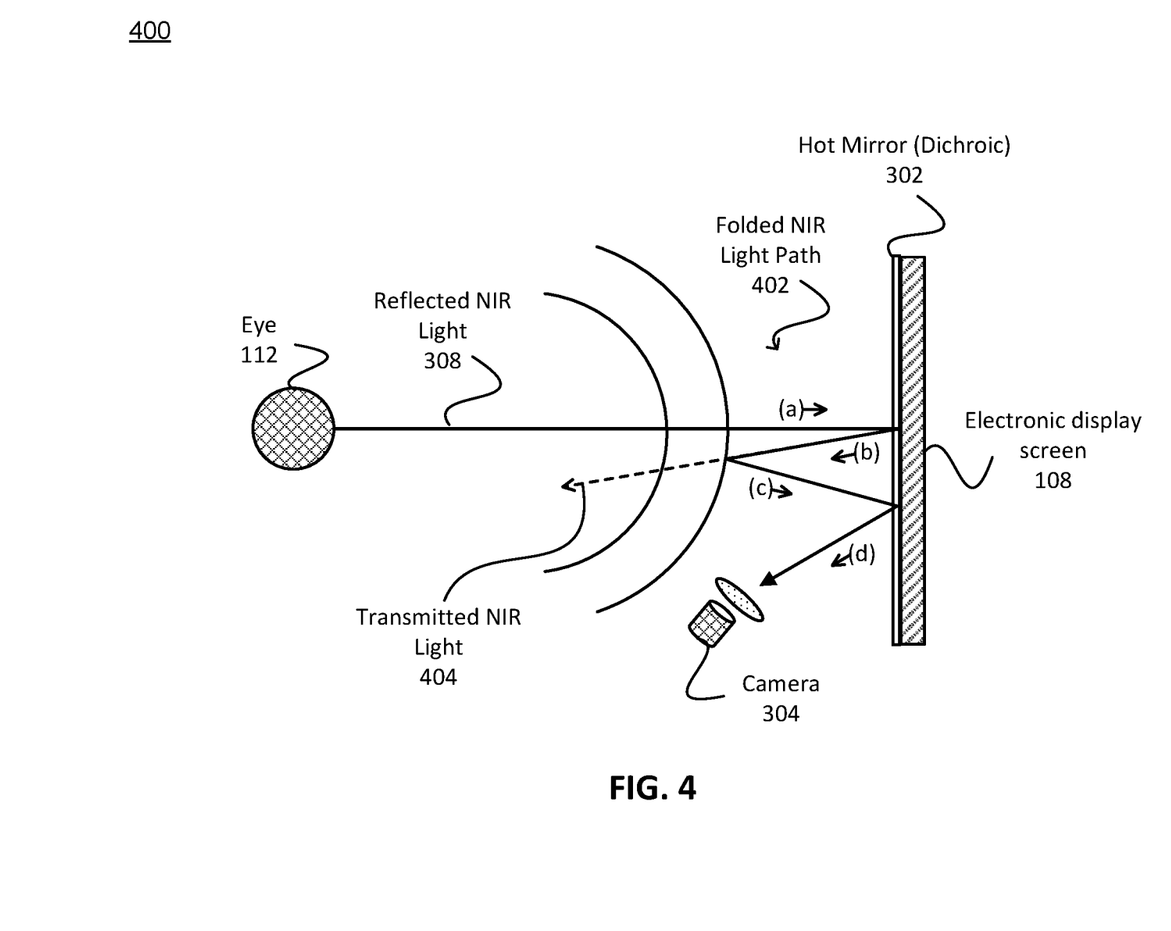
FIG. 4 shows an example head-mounted display that includes a pancake lens block with a dichroic element on a transmission surface of an electronic display screen configured to cause infrared light reflected from an eye of a user to undergo two or more reflections off the dichroic element to an image capturing element, in accordance with one embodiment.

FIG. 4 shows an example HMD 400 that includes PLB 102, electronic display 108, dichroic element or hot mirror 302 also on a transmission surface of electronic display screen 108. As above, the hot mirror 302 is a film, layer, or other coating on electronic display 108 configured to transmit light in the visible spectrum, reflect light in the near-infrared (NIR), and, in this particular embodiment, cause NIR light reflected from the eye 112 of a user to undergo, in this embodiment, multiple reflection off the hot mirror 302 and the back optical element 106 before arriving at the camera 304 resulting in a folded NIR light path 402.

Folded NIR light path 402, in this example, shows four segments (a, b, c, d). Thus, the NIR light 308 reflected or scattered off the front surface of the eye 112 is transmitted through PLB 102 (i.e., the concave surface of the front optical element 104 and through mirrored surface 132 of the convex surface of the back optical element 106) and incident on hot mirror 302. As shown in FIG. 4, the NIR light 308 is transmitted through the back optical element 106 and the path segment of the light is shown as segment (a). Segment (a) ends as the NIR light 308 reflects off the hot mirror 302 to begin segment (b). On segment (b), the NIR light 308 has been reflected off the hot mirror 302 back the back optical element 106. As mentioned above, the back optical element 106 includes mirrored surface 132 which is a beam splitter or which includes a 50/50 coating (i.e., the coating reflects 50% of the light and transmits the other 50% of the light). Thus, the mirrored surface 132 of the back optical element 106 reflects 50% of the NIR light 308 back toward the hot mirror to begin segment (c) while also transmitting another 50% of the NIR light 308 shown in FIG. 4 as transmitted NIR light 404. Accordingly, in segment (c), the NIR light 308 has been reflected off mirrored surface 132 back to the hot mirror 302, which is finally reflected to camera 304 in segment (d). Thus, PLB 102 and hot mirror 302 are configured such that the rays of the NIR light 308 deviate far enough away from PLB 102 in a folded NIR light path, such as folded NIR light path 402, in order for the NIR light 308 to be imaged by camera 304 located off to the side or underneath PLB 102. The eye tracking system then analyzes the images captured by the camera 304 to identify one or more glints corresponding to the location of the eye 112 of the user and determines a gaze direction of the eye 112 based on the location of the glints.

As described above with respect to FIG. 3, the eye tracking system may include an infrared (IR) emitter that emits the NIR light 308. Thus, in one embodiment, the IR emitter emits the NIR light 308 toward the hot mirror 302 that causes the NIR light 308 to be reflected off the electronic display screen 108 and eventually to the eye 112 of the user to illuminate the eye 112 for imaging by the camera 304. Thus, FIG. 3 shows an embodiment of an eye tracking configuration for a pancake lens block in a head mounted display that utilizes a hot mirror and the mirrored or reflective surface of the back optical element of the pancake lens to cause the NIR light rays to undergo multiple reflections before being received by the camera. Thus, there exist multiple pathways through which the NIR light 308 from the eye 112 can reach the camera 304; after reflecting, once, twice, or multiple times between the display and the lens. Further, the multiple reflections can allow for multiple views of the same eye from different views by camera 304. Thus, this approach provides a way to implement multi-view imaging of the eye 112 with a single camera. The multiple views of the eye 112 when analyzed together can provide a more accurate determination for where within a virtual scene the user is looking based on the position of the user's pupil in the images, for example.

Figure 5A:
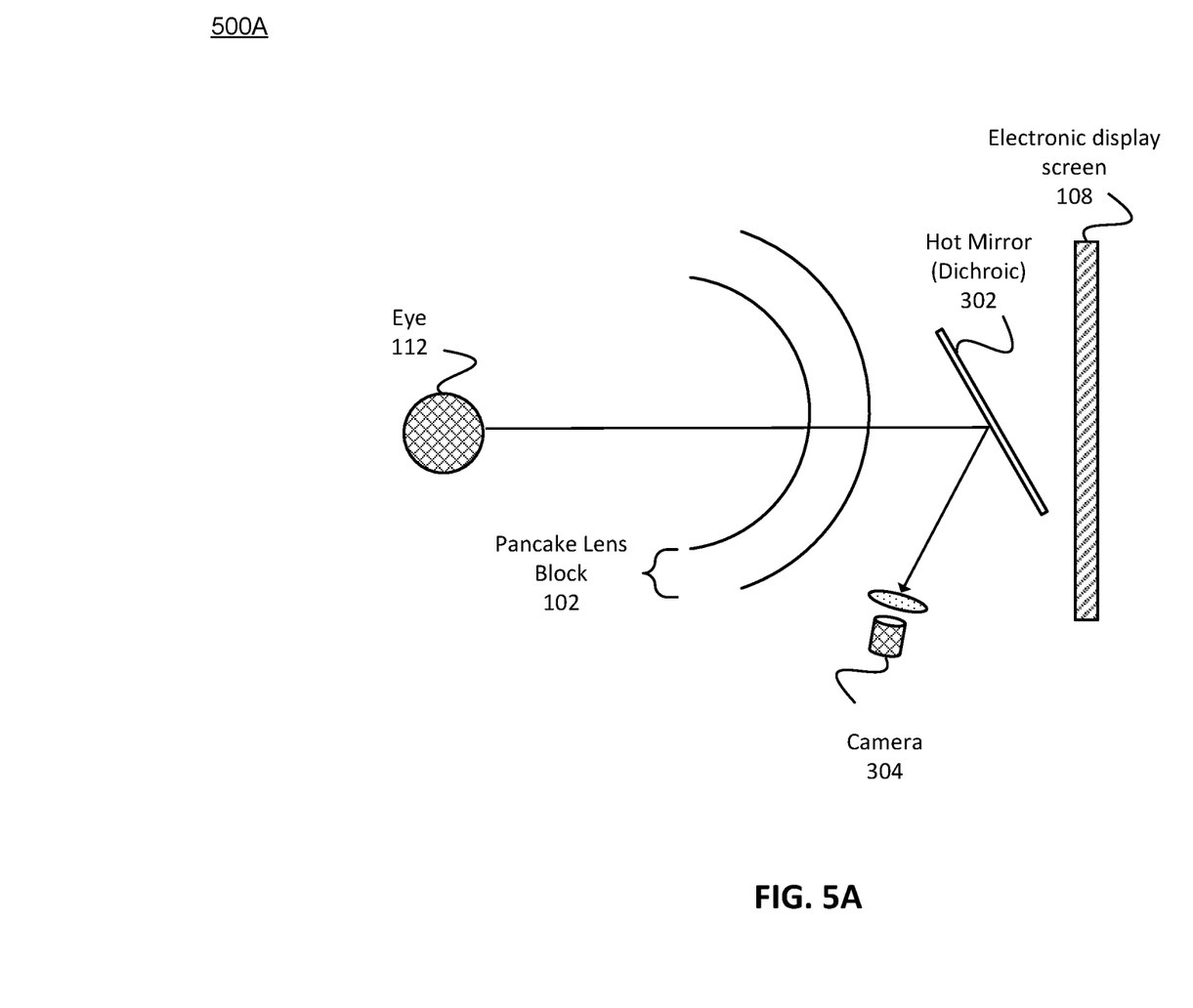
FIG. 5A shows an example head-mounted display that includes a pancake lens block with a dichroic element positioned between an electronic display screen and the pancake lens block configured to cause infrared light reflected from an eye of a user to undergo a single reflection off the dichroic element to an image capturing element, in accordance with one embodiment.

FIG. 5A shows an example HMD 500A that includes PLB 102, electronic display 108, hot mirror 302 located between PLB 102 and the electronic display screen 108. The hot mirror 302, in one embodiment, is a free standing optical element configured to transmit light in the visible spectrum, reflect light in the near-infrared (NIR), and, in this particular embodiment, cause NIR light reflected from an eye 112 of a user to undergo a single reflection off hot mirror 302 to an image capturing element 304 located off-axis relative to an optical axis 150 of PLB 102 (i.e., camera optical axis 306 is positioned at an angle relative to optical axis 150 of PLB 102). As discussed with respect to FIG. 3, this allows the camera 304 to be located adjacent (e.g., to the side, in a periphery, etc. relative to) optical axis 150 while still allowing a reflection of the eye 112 to be viewable to the eye tracking system. Thus, as in FIG. 3, NIR light 308 reflected or scattered off the front surface of the eye 112 is transmitted through PLB 102 and incident on hot mirror 302. Accordingly, PLB 102 and hot mirror 302 are configured such that the rays of the NIR light 308 deviate far enough away from PLB 102 to be imaged by camera 304 located off to the side or underneath PLB 102.

Figure 5B:
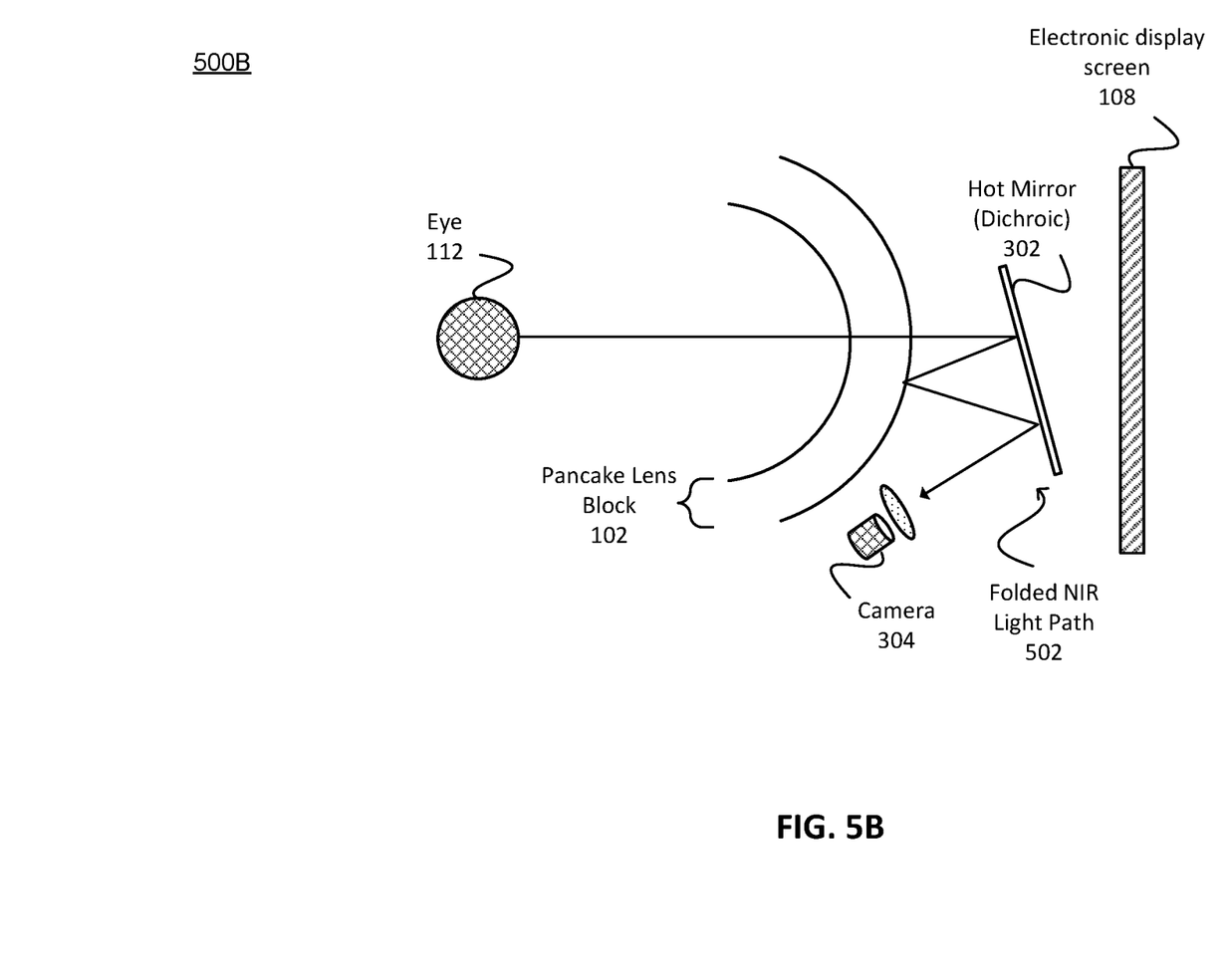
FIG. 5B shows an example head-mounted display that includes a pancake lens block with a dichroic element positioned between an electronic display screen and the pancake lens block configured to cause infrared light reflected from an eye of a user to undergo two or more reflections off the dichroic element to an image capturing element, in accordance with one embodiment.

FIG. 5B shows an example HMD 500B that includes PLB 102, electronic display 108, hot mirror 302 located between PLB 102 and the electronic display screen 108, as described above with respect to FIG. 5A. In this example, however, the hot mirror 302 is a free standing optical element configured in combination with the mirrored surface 132 of the back optical element 106 to cause the light to follow a folded NIR light path 502 where the NIR light reflected from the eye 112 undergoes multiple reflection off the hot mirror 302 and the back optical element 106 before arriving at the camera 304, as described above with respect to FIG. 4.

Figure 6A:
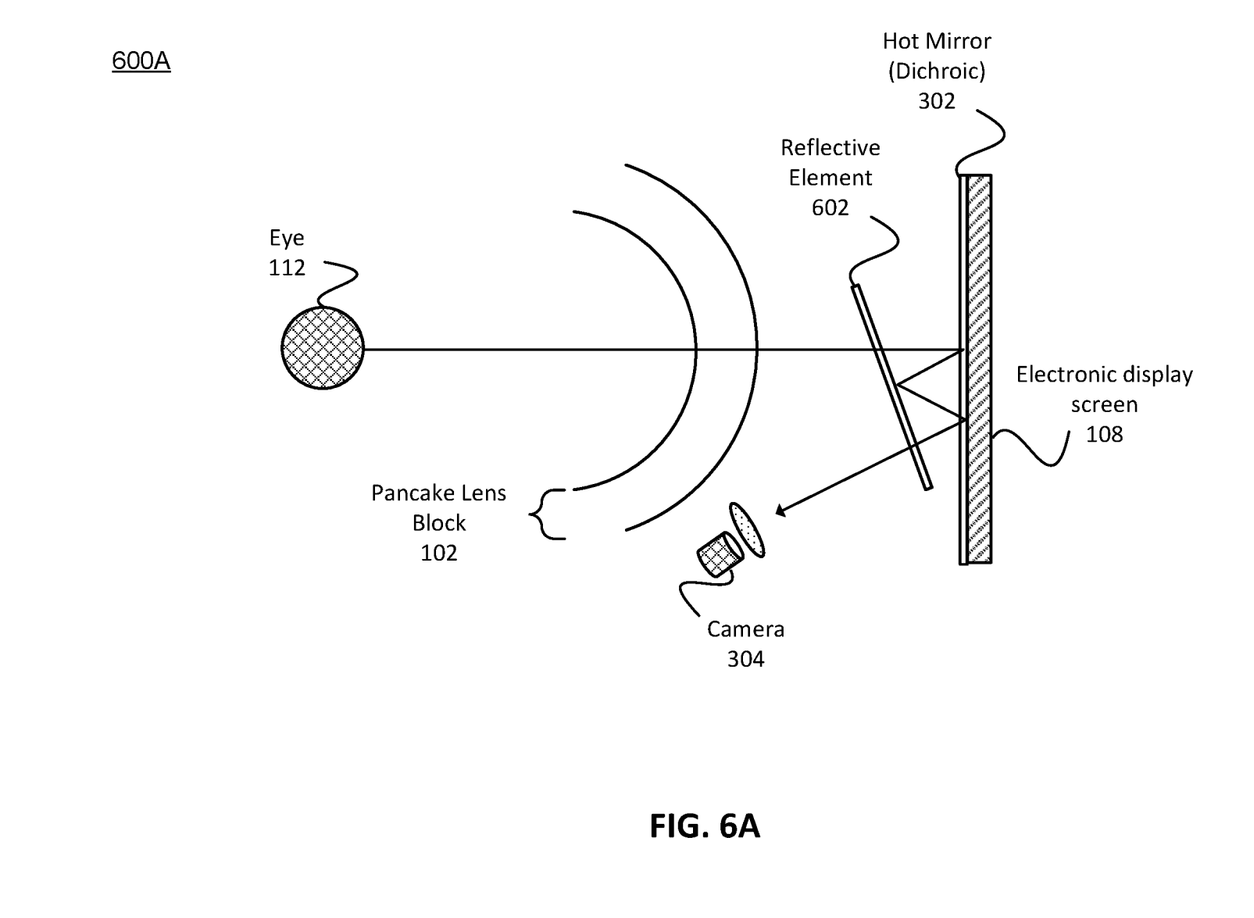
FIG. 6A shows an example head-mounted display that includes a pancake lens block with a dichroic element on a transmission surface of an electronic display screen and a reflective optical element positioned between the electronic display screen and the pancake lens block configured to cause infrared light reflected from an eye of a user to undergo two or more reflections off the dichroic element to an image capturing element, in accordance with one embodiment.
Figure 6B:
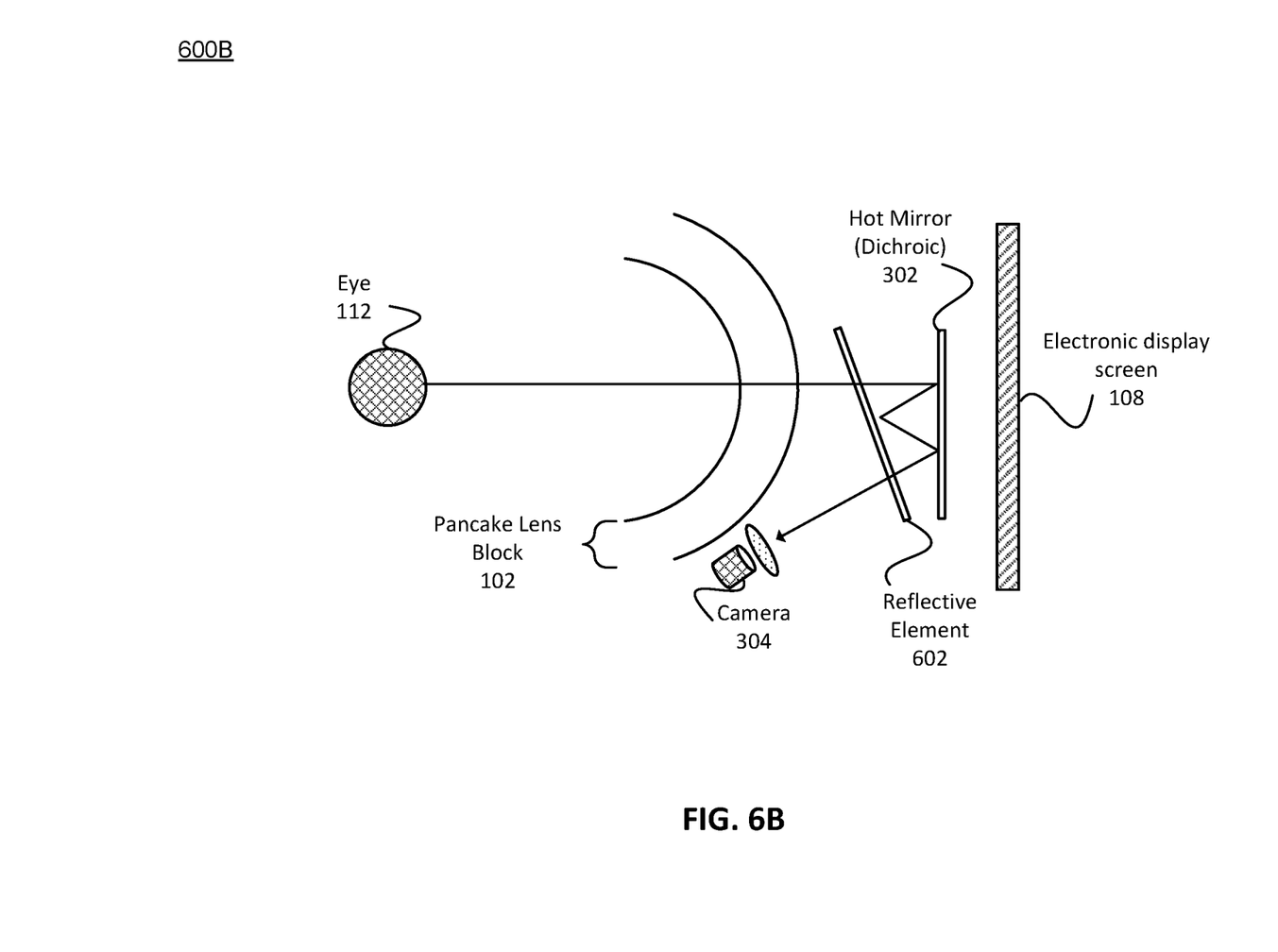
FIG. 6B shows an example head-mounted display that includes a pancake lens block with a dichroic element and an additional reflective optical element positioned between an electronic display screen and the pancake lens block configured to cause infrared light reflected from an eye of a user to undergo two or more reflections off the dichroic element and the reflective optical element to an image capturing element, in accordance with one embodiment.

FIGS. 6A and 6B introduce an additional optical element, such as an additional optical element (e.g., a beam splitter, reflective polarizer (plus quarter-wave plates), an additional dichroic, etc.) relative to the embodiments described above. The additional optical element can be either flat or curved. With this additional element in place, the NIR light can be guided into the camera in many different ways. Thus, the light can be guided through multiple reflections between the two optical elements and then into the camera. Light can be guided through multiple reflections between the display and the two optical elements, akin to a multi-layer cavity, and so forth.

Accordingly, FIG. 6A shows an example HMD 600A that includes PLB 102, electronic display 108, hot mirror 302 located on a transmission surface of electronic display screen 108, as described above with respect to FIGS. 3 and 4, and an additional reflective optical element 602. As above, the hot mirror 302 is a film, layer, or other coating on electronic display 108 configured to transmit light in the visible spectrum, reflect light in the near-infrared (NIR), and cause NIR light reflected from the eye 112 of a user to undergo, in this embodiment, multiple reflection off the hot mirror 302 and the reflective optical element 602 before arriving at the camera 304 resulting in a folded NIR light path.

The folded NIR light path, in this example, shows the NIR light reflected or scattered off the front surface of the eye 112 is transmitted through PLB 102 (i.e., the concave surface of the front optical element 104, through mirrored surface 132 of the convex surface of the back optical element 106), and through the reflective element 602 and incident on hot mirror 302. As shown in FIG. 6A, the NIR light reflects off the hot mirror 302 back toward the reflective element 602, which reflects the NIR light one additional time back towards the hot mirror 302. As mentioned above, reflective element 602 may include a partially mirrored or reflective surface that operates as a beam splitter by reflecting a portion of the NIR light and transmitting another portion. Thus, PLB 102, reflective element 602, and hot mirror 302 are configured such that the rays of the NIR light eventually deviate far enough away from PLB 102 in a folded NIR light path to reach camera 304.

FIG. 6B shows another example HMD 600B that includes PLB 102, electronic display 108, hot mirror 302, and an additional reflective optical element 602 where both the hot mirror and the additional reflective optical element 602 are free standing optical elements in optical series with PLB 102 and the electronic display 108. As described above with respect to FIG. 6A, the hot mirror 302 is configured to transmit light in the visible spectrum, reflect light in the near-infrared (NIR), and cause NIR light reflected from the eye 112 of a user to undergo, in this embodiment, multiple reflection off the hot mirror 302 and the reflective optical element 602 before arriving at the camera 304 resulting in a folded NIR light path. However, in this example, the hot mirror 302 is a free standing optical element, not a layer on the electronic display 108.

In one embodiment, the pancake lens block includes a back curved optical element and a front curved optical element in optical series with the back curved optical element. The back curved optical element transmits a first portion of light from an electronic display screen. The electronic display screen displays a virtual scene to a user wearing the HMD. The front curved optical element reflects the first portion of light from the electronic display screen transmitted by the back curved optical element reflecting a second portion of the light from the front curved optical element back to the front curved optical element back to the front curved optical element for transmission to an exit pupil of the VR headset.

The eye tracking system includes a reflective optical element, an image capturing element, and a controller. The reflective optical element is located between the back curved optical element and the electronic display screen. The reflective optical element transmits light from the electronic display screen and reflects near-infrared spectrum light from an eye of a user. In one embodiment, the reflective optical element is a coating on the back curved optical element. The coating may be a dichroic film on the electronic display screen. The dichroic film may pass light of a small range of wavelengths, for example near-infrared light, while reflecting other wavelengths, for example visible light.

The reflective optical element may also be a freestanding element between the back curved optical element and the electronic display. In alternate embodiments, the reflective optical element reflects the near-infrared spectrum light off the back optical element to the eye of the user. In yet another embodiment, the reflective optical element reflects the near-infrared spectrum light to the image capturing element located off to a side. The image capturing element receives the near-infrared spectrum light from the eye of the user that has been reflected off the reflective optical element.

The image capturing element may be a camera. The camera may include an infrared (IR) emitter that reflects the near-infrared light off the reflective optical element to the eye of the user. In alternate embodiments, the HMD emits the near-infrared spectrum light.

System Overview

Figure 7:
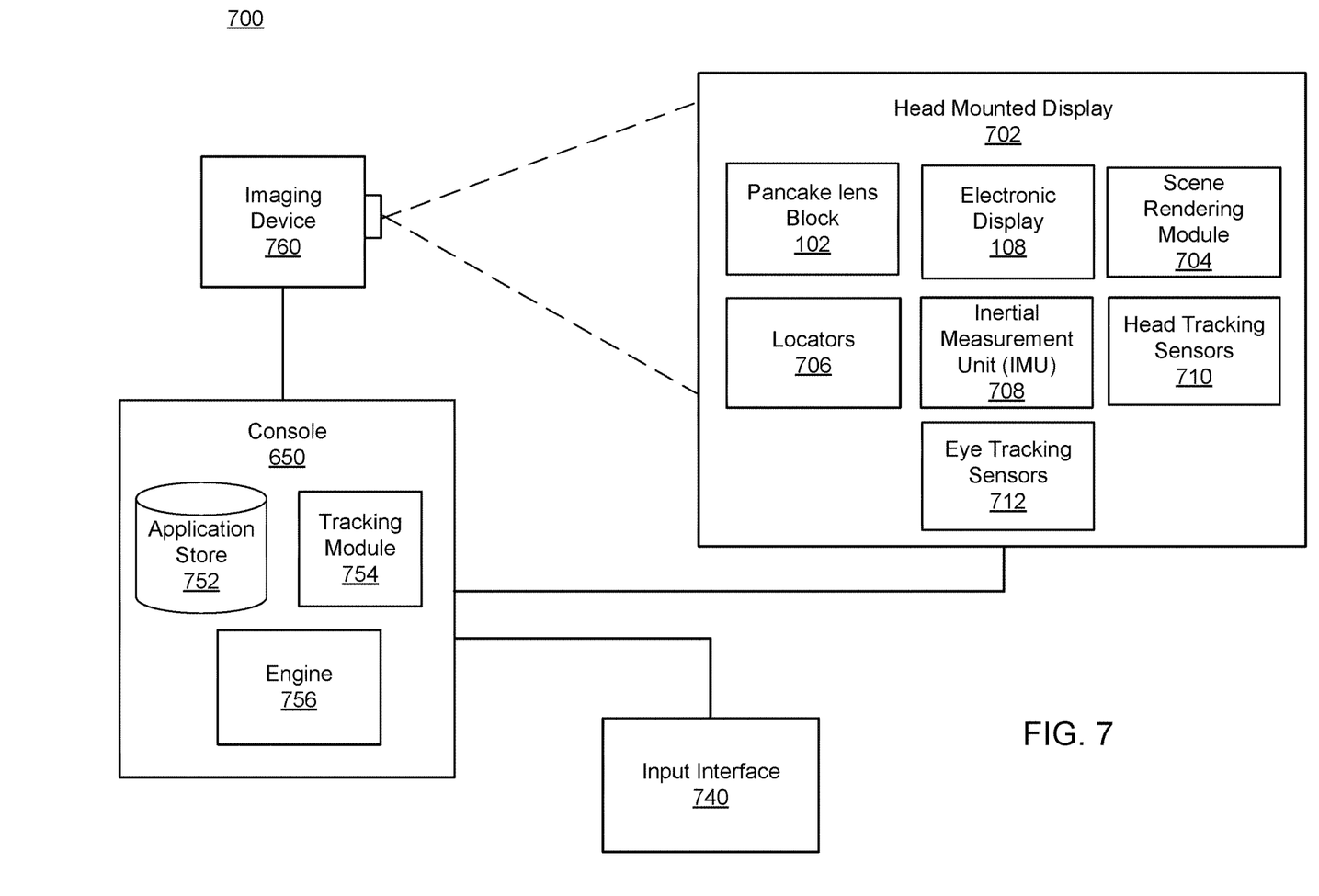
FIG. 7 is a system environment in which a HMD with a pancake lens operates, in accordance with at least one embodiment.

FIG. 7 is a block diagram of system environment 700 including HMD 702 that includes PLB 102. System environment 700 shown by FIG. 7 comprises HMD 702, imaging device 760, and an input interface 740 that are each coupled to the console 750. While FIG. 7 shows an example system 700 including one HMD 702, one imaging device 760, and one input interface 740, in other embodiments any number of these components may be included in the system 700. For example, there may be multiple HMD 702 each having an associated input interface 740 and being monitored by one or more imaging devices 760, with each HMD 702, input interface 740, and imaging devices 760 communicating with the console 750. In alternative configurations, different and/or additional components may be included in the system environment 700. The system 700 may operate in a system environment, an augmented reality (AR) system environment, a mixed reality (MR) system environment, or some combination thereof.

HMD 702 presents content to a user. Example content includes images, video, audio, or some combination thereof. Audio content may be presented via a separate device (e.g., speakers and/or headphones) external to HMD 702 that receives audio information from HMD 702, console 750, or both. HMD 702 includes PLB 102, electronic display 108, locators 706, internal measurement unit (IMU) 708, head tracking sensors 710, and scene rendering module 704. In some embodiments, the HMD 702 may present VR, AR, MR, or some combination thereof to a user. In the AR and/or MR embodiments, the HMD 702 augments views of a physical, real-world environment with computer-generated elements (e.g., images, video, sound, etc.).

Electronic display screen 108 presents visual information (i.e., image light) from an electronic signal. The electronic display screen 108 may be, e.g., a liquid crystal display (LCD), an organic light emitting diode (OLED) display, an active-matrix organic light-emitting diode display (AMO-LED), some type of flexible display, or some combination thereof. In some embodiments, electronic display screen 108 includes a linear polarizer or admits light that is linearly polarized.

PLB 102 directs light from electronic display 108 to an exit pupil for viewing by a user using one or more optical elements in addition to the two curved optical elements described in FIGS. 1-2. For example, the one or more optical elements may include apertures, Fresnel lenses, convex lenses, concave lenses, filters, and so forth, and may include combinations of different optical elements. In some embodiments, one or more of the optical elements of PLB 102 may have one or more coatings, such as anti-reflective coatings. Magnification of the image light by PLB 102 allows electronic display 108 to be physically smaller, weigh less, and consume less power than larger displays. Additionally, magnification of the image light may increase a field of view of the displayed content. For example, the field of view of the displayed content is such that the displayed content is presented using almost all (e.g., 150 degrees diagonal), and in some cases all, of the user's field of view.

Locators 706 are objects located in specific positions on HMD 702 relative to one another and relative to a specific reference point on HMD 702. Locators 706 may be a light emitting diode (LED), a corner cube reflector, a reflective marker, a type of light source that contrasts with an environment in which HMD 702 operates, or some combination thereof. Active locators 706 (i.e., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

Locators 706 can be located beneath an outer surface of HMD 702, which is transparent to the wavelengths of light emitted or reflected by locators 706 or is thin enough not to substantially attenuate the wavelengths of light emitted or reflected by locators 706. Further, the outer surface or other portions of HMD 702 can be opaque in the visible band of wavelengths of light. Thus, locators 706 may emit light in the IR band while under an outer surface of HMD 702 that is transparent in the IR band but opaque in the visible band.

IMU 708 is an electronic device that generates fast calibration data based on measurement signals received from one or more head tracking sensors 710, which generate one or more measurement signals in response to motion of HMD 702. Examples of head tracking sensors 710 include accelerometers, gyroscopes, magnetometers, other sensors suitable for detecting motion, correcting error associated with IMU 708, or some combination thereof. Head tracking sensors 710 may be located external to IMU 708, internal to IMU 708, or some combination thereof.

Based on the measurement signals from head tracking sensors 710, IMU 708 generates fast calibration data indicating an estimated position of HMD 702 relative to an initial position of HMD 702. For example, head tracking sensors 710 include multiple accelerometers to measure translational motion (forward/back, up/down, left/right) and multiple gyroscopes to measure rotational motion (e.g., pitch, yaw, and roll). IMU 708 can, for example, rapidly sample the measurement signals and calculate the estimated position of HMD 702 from the sampled data. For example, IMU 708 integrates measurement signals received from the accelerometers over time to estimate a velocity vector and integrates the velocity vector over time to determine an estimated position of a reference point on HMD 702. The reference point is a point that may be used to describe the position of HMD 702. While the reference point may generally be defined as a point in space, in various embodiments, reference point is defined as a point within HMD 702 (e.g., a center of the IMU 708). Alternatively, IMU 708 provides the sampled measurement signals to console 750, which determines the fast calibration data.

IMU 708 can additionally receive one or more calibration parameters from console 750. As further discussed below, the one or more calibration parameters are used to maintain tracking of HMD 702. Based on a received calibration parameter, IMU 708 may adjust one or more IMU parameters (e.g., sample rate). In some embodiments, certain calibration parameters cause IMU 708 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

Scene render module 704 receives content for the virtual scene from engine 756 and provides the content for display on electronic display 702. Additionally, scene render module 704 can adjust the content based on information IMU 708 and head tracking sensors 710. For example, upon receiving the content from engine 756, scene render module 704 adjusts the content based on the predicted state (i.e., eye position and focal length) of PLB 102 received from focus prediction module 708. Additionally, scene render module 704 determines a portion of the content to be displayed on electronic display 702 based on one or more of tracking module 754, head tracking sensors 710, or IMU 708, as described further below.

Imaging device 760 generates slow calibration data in accordance with calibration parameters received from console 750. Slow calibration data includes one or more images showing observed positions of locators 706 that are detectable by imaging device 760. Imaging device 760 may include one or more cameras, one or more video cameras, other devices capable of capturing images including one or more locators 706, or some combination thereof. Additionally, imaging device 760 may include one or more filters (e.g., for increasing signal to noise ratio). Imaging device 760 is configured to detect light emitted or reflected from locators 706 in a field of view of imaging device 760. In embodiments where locators 706 include passive elements (e.g., a retroreflector), imaging device 760 may include a light source that illuminates some or all of locators 706, which retro-reflect the light towards the light source in imaging device 760. Slow calibration data is communicated from imaging device 760 to console 750, and imaging device 760 receives one or more calibration parameters from console 750 to adjust one or more imaging parameters (e.g., focal length, focus, frame rate, ISO, sensor temperature, shutter speed, aperture, etc.).

Input interface 740 is a device that allows a user to send action requests to console 750. An action request is a request to perform a particular action. For example, an action request may be to start or end an application or to perform a particular action within the application. Input interface 740 may include one or more input devices. Example input devices include a keyboard, a mouse, a game controller, or any other suitable device for receiving action requests and communicating the received action requests to console 750. An action request received by input interface 740 is communicated to console 750, which performs an action corresponding to the action request. In some embodiments, input interface 740 may provide haptic feedback to the user in accordance with instructions received from console 750. For example, haptic feedback is provided by the input interface 740 when an action request is received, or console 750 communicates instructions to input interface 740 causing input interface 740 to generate haptic feedback when console 750 performs an action.

Console 750 provides content to HMD 702 for presentation to the user in accordance with information received from imaging device 760, HMD 702, or input interface 740. In the example shown in FIG. 7, console 750 includes application store 752, tracking module 754, and engine 756. Some embodiments of console 750 have different or additional modules than those described in conjunction with FIG. 7. Similarly, the functions further described below may be distributed among components of console 750 in a different manner than is described here.

Application store 752 stores one or more applications for execution by console 750. An application is a group of instructions, that when executed by a processor, generates content for presentation to the user. Content generated by an application may be in response to inputs received from the user via movement of HMD 702 or interface device 740. Examples of applications include gaming applications, conferencing applications, video playback application, or other suitable applications.

Tracking module 754 calibrates the system using one or more calibration parameters and may adjust one or more calibration parameters to reduce error in determining position of HMD 702. For example, tracking module 754 adjusts the focus of imaging device 760 to obtain a more accurate position for observed locators 706 on HMD 702. Moreover, calibration performed by tracking module 754 also accounts for information received from IMU 708. Additionally, if tracking of HMD 702 is lost (e.g., imaging device 760 loses line of sight of at least a threshold number of locators 706), tracking module 754 re-calibrates some or all of the system components.

Additionally, tracking module 754 tracks the movement of HMD 702 using slow calibration information from imaging device 760 and determines positions of a reference point on HMD 702 using observed locators from the slow calibration information and a model of HMD 702. Tracking module 754 also determines positions of the reference point on HMD 702 using position information from the fast calibration information from IMU 708 on HMD 702. Additionally, tracking module 754 may use portions of the fast calibration information, the slow calibration information, or some combination thereof, to predict a future location of HMD 702, which is provided to engine 756.

Engine 756 executes applications within the system and receives position information, acceleration information, velocity information, predicted future positions, or some combination thereof for HMD 702 from tracking module 754. Based on the received information, engine 756 determines content to provide to HMD 702 for presentation to the user, such as a virtual scene. For example, if the received information indicates that the user has looked to the left, engine 756 generates content for HMD 702 that optical elements or tracks the user's movement in a virtual environment. Additionally, engine 756 performs an action within an application executing on console 750 in response to an action request received from the input interface 740 and provides feedback to the user that the action was performed. The provided feedback may be visual or audible feedback via HMD 702 or haptic feedback via input interface 740.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head mounted display (HMD) comprising:
  a processor;
  an electronic display screen configured to display a virtual scene to a user wearing the HMD;
  a lens block configured to focus light of the virtual scene displayed by the electronic display screen to an exit pupil of the HMD; and
  an eye tracking system comprising:
    a dichroic coating on a transmission surface of the electronic display screen configured to transmit light from the electronic display and reflect near-infrared spectrum light from an eye of a user; and
    a camera configured to receive the near-infrared spectrum light from the eye of the user that has been reflected off the dichroic coating on the electronic display screen, the camera being located off-axis relative to a first optical axis of the lens block, a second optical axis of the camera being located at an angle relative to the first optical axis of the lens block.

2. The HMD of claim 1, wherein the eye tracking system further comprises:
  a reflective optical element positioned between the dichroic coating and the lens block, the reflective optical element configured to reflect at least a portion of the near-infrared spectrum light from the dichroic coating back toward the dichroic coating.

3. The HMD of claim 2, wherein the dichroic coating and the reflective optical element are configured in combination to cause the near-infrared spectrum light reflected from the eye of the user to be:
   transmitted, by the reflective optical element, toward the dichroic coating,
   reflected, by the dichroic coating, back towards the reflective optical element,
   reflected, at least one second time by the reflective optical element, back toward the dichroic coating, and
   reflected, by the dichroic coating, to the camera.

4. The HMD of claim 2, wherein the reflective optical element is located on an optical element of the lens block.

5. The HMD of claim 2, wherein the reflective optical element is positioned at an angle relative to the first optical axis of the lens block to reflect the near-infrared spectrum light from the eye of the user at an angle towards the dichroic coating such that the near-infrared spectrum light is reflected towards the second optical axis of the camera.

6. The HMD of claim 2, wherein the near-infrared spectrum light from the eye of the user undergoes at least one reflection between the reflective optical element and the dichroic coating before being received by the camera, wherein the reflections are part of a light path to the camera located off-axis relative to the first optical axis of the lens block.

7. The HMD of claim 5, wherein the dichroic coating is positioned at an angle relative to the first optical axis of the lens block to reflect the near-infrared spectrum light from the eye of the user towards the second optical axis of the camera.

8. The HMD of claim 1, wherein the eye tracking system further comprises:
   an infrared (IR) emitter configured to emit the near-infrared spectrum light towards the dichroic coating to illuminate the eye of the user wearing the HMD.

9. The HMD of claim 1, wherein the eye tracking system is further configured to:
   analyze one or more images captured by the camera to identify one or more glints corresponding to the eye of the user, and
   determine a gaze direction of the eye of the user based on the identified glints from the one or more images.

10. The HMD of claim 1, wherein the near-infrared spectrum light from the eye of the user undergoes a single reflection off the dichroic coating on the electronic display screen before arriving at the camera.

11. A head mounted display (HMD) comprising:
   a processor;
   an electronic display screen configured to display a virtual scene to a user wearing the HMD;
   a lens block configured to focus light of the virtual scene displayed by the electronic display screen to an exit pupil of the HMD; and
   an eye tracking system comprising:
      a dichroic coating positioned between the electronic display screen and the lens block configured to transmit light from the electronic display and reflect near-infrared spectrum light from an eye of a user; and
      a camera configured to receive the near-infrared spectrum light from the eye of the user that has been reflected off the dichroic coating, the camera being located off-axis relative to a first optical axis of the lens block, a second optical axis of the camera being located at an angle relative to the first optical axis of the lens block.

12. The HMD of claim 11, wherein the dichroic coating is positioned at an angle relative to the first optical axis of the lens block to reflect the near-infrared spectrum light from the eye of the user towards the second optical axis of the camera.

13. The HMD of claim 11, wherein the near-infrared spectrum light from the eye of the user undergoes a single reflection off the dichroic coating before arriving at the camera.

14. The HMD of claim 11, wherein the eye tracking system further comprises:
   a reflective optical element positioned between the dichroic coating and the lens block, the reflective optical element configured to reflect at least a portion of the near-infrared spectrum light from the dichroic coating back toward the dichroic coating.

15. The HMD of claim 14, wherein the dichroic coating and the reflective optical element are configured in combination to cause the near-infrared spectrum light reflected from the eye of the user to be:
   transmitted, by the reflective optical element, toward the dichroic coating,
   reflected, by the dichroic coating, back towards the reflective optical element,
   reflected, at least one second time by the reflective optical element, back toward the dichroic coating, and
   reflected, by the dichroic coating, to the camera.

16. The HMD of claim 14, wherein the reflective optical element is located on an optical element of the lens block.

17. The HMD of claim 14, wherein the reflective optical element is positioned at an angle relative to the first optical axis of the lens block to reflect the near-infrared spectrum light from the eye of the user at an angle towards the dichroic coating such that the near-infrared spectrum light is reflected towards the second optical axis of the camera.

18. The HMD of claim 14, wherein the near-infrared spectrum light from the eye of the user undergoes at least one reflection between the reflective optical element and the dichroic coating before being received by the camera, wherein the reflections are part of a light path to the camera located off-axis relative to the first optical axis of the lens block.

19. The HMD of claim 11, wherein the eye tracking system further comprises:
   an infrared (IR) emitter configured to emit the near-infrared spectrum light towards the dichroic coating to illuminate the eye of the user wearing the HMD.

20. The HMD of claim 11, wherein the eye tracking system is further configured to:
   analyze one or more images captured by the camera to identify one or more glints corresponding to the eye of the user, and
   determine a gaze direction of the eye of the user based on the identified glints from the one or more images.

* * * * *